United States Patent [19]

Hidalgo-Briceno

[11] 3,855,998
[45] Dec. 24, 1974

[54] ENTERTAINMENT DEVICE
[75] Inventor: Miguel Hidalgo-Briceno, Caracas, Venezuela
[73] Assignees: Antonia Aagaard de Hidalgo; Luigi Mari Nolfi, both of Caracas, Venezuela; part interest to each
[22] Filed: Mar. 14, 1973
[21] Appl. No.: 341,284

[52] U.S. Cl............ 128/2.1 B, 128/2.1 Z, 273/1 E
[51] Int. Cl................................................ A61b 5/04
[58] Field of Search............ 128/2.1 B, 2.1 Z, 2.1 R, 128/2.06 R, 2.1 M, 2 R, 1 C; 340/279, 407; 273/1 E

[56] References Cited
UNITED STATES PATENTS

| | | | |
|---|---|---|---|
| 2,860,627 | 11/1958 | Harden et al. | 128/2.1 B |
| 2,902,030 | 9/1959 | Kennedy et al. | 128/2.1 M |
| 3,032,029 | 5/1962 | Cunningham | 128/2.1 B |
| 3,123,768 | 3/1964 | Burch et al. | 128/2.1 B |
| 3,172,404 | 3/1965 | Copenhaver et al. | 128/2.1 B |
| 3,207,847 | 9/1965 | Epstein | 128/1 C |
| 3,468,302 | 9/1969 | Cowell | 128/2.1 R |
| 3,470,870 | 10/1969 | Schoffer | 128/1 C |
| 3,495,596 | 2/1970 | Condiet | 128/1 C |
| 3,780,724 | 12/1973 | John | 128/2.1 B |

Primary Examiner—Richard A. Gaudet
Assistant Examiner—Lee S. Cohen
Attorney, Agent, or Firm—Peter L. Tailer

[57] ABSTRACT

An entertainment device has sensing means connected to a user, the sensing means, as one example, sensing galvanic skin response and theta waves in the brain. According to a given measured state of a user, the device provides a given type of audio-visual stimulation to the user for a timed interval to hold him in or move him toward a desired state. At the end of the interval, the user's state is again measured and a further timed audio-visual response according to his measured state is presented to the user. The audio visual stimulation can be passages of music with desired emotional content and flashing lights of given colors and intensities. Alternately, the visual part of the stimulation can be projected images. The entertainment device thus is programmed according to the response of a user to move him toward a desired state and to return him more often to that state of aesthetic experience.

5 Claims, 1 Drawing Figure

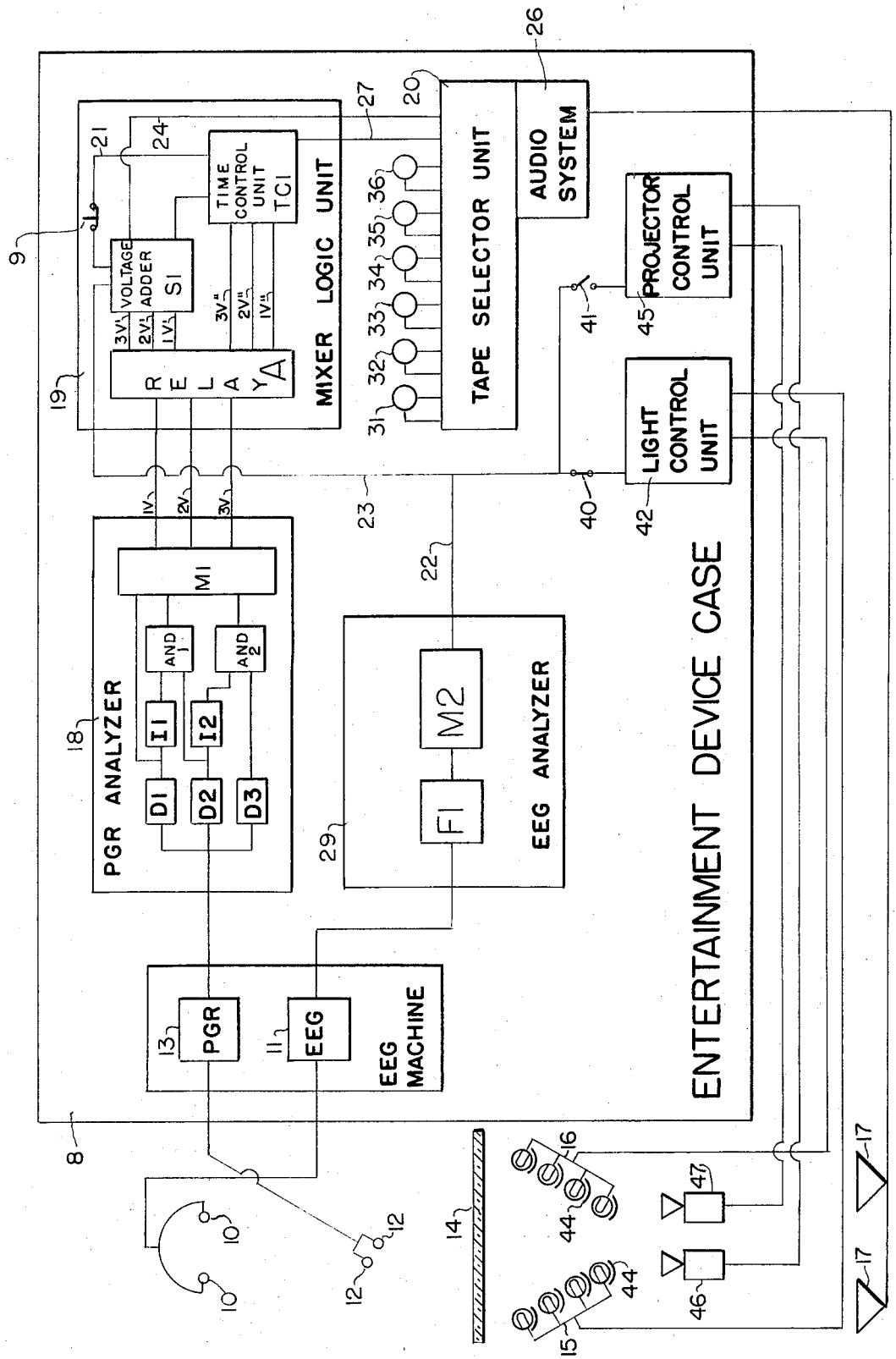

ENTERTAINMENT DEVICE

SUMMARY OF THE INVENTION

The device which exemplifies this invention analyzes six states in which a user may be while receiving audio-visual selections. The six states are small, medium, and large psycho-galvanic skin response combined with the presence or absense of theta waves in the brain. The presence of theta waves along with a small psycho-galvanic skin response appears to indicate the enjoyment of an aesthetic experience at its highest point. The other five states indicate levels of aesthetic experience leading to or retreating from this highest state of aesthetic experience.

A selector unit provides a given type of audio-visual stimulation after monitoring the state of a user. For small, large, and medium psycho-galvanic skin response, the time of a given stimulation is, respectively, 5, 10, and 25 seconds. Flashing lights for theta states should be low intensity, six flashes per second, blue, green, yellow, and violet lights to induce a user to remain in a theta state. Flashing light combinations for non-theta states would be medium to high intensity, 12 flashes per second red, orange, green, and indigo lights. The musical stimuli would be of transitional music for the non-theta states to excite a user into a theta state and holding music for a theta state to keep the user in a theta state while moving him towards the most desired small psycho-galvanic skin response along with the presence of theta brain waves.

Instead of flashing colored lights, which may be flashed in random sequences, sequences of projected images with suitable emotional content may be presented to a user. The projected images can be still projections or motion pictures with suitable color and intensity. In more complex devices, odors, vibrations, touches, and other sensation producing stimuli may be used. Stereo sound and pictures may be used, the pictures being abstract or objective.

The sensing means of the device could sense additional brain waves, the retinal opening of the eyes, eyeball motions, heart beat, muscle tension, contraction of the stomach, blood pressure, respiration rate, and other measurable and generally unconsious or reflex physiological reactions of the user.

Applications for the use of this device are many and varied. For example, it can be used to frighten or terrify a user as well as provide pleasant contemplative experiences. It can also be applied to teaching and conditioning machines which provide stimuli according to a persons measured state.

BRIEF DESCRIPTION OF THE DRAWING

The FIGURE of the drawing is a block diagram of a device according to this invention.

DESCRIPTION OF THE PREFERRED EMBODIMENT

Referring to the Drawing in detail, a user of this invention places the electrodes 10 of an electroencephlograph 11 on his temples and he fixes the electrodes 12 of a psychogalvanic skin response detector 13 on his wrist or any other suitable location. The user then relaxes and observes a translucent screen 14 behind which there are disposed two sets of colored lights 15 and 16 and a loud speaker system 17.

The device 8 is actuated by pressing button 9 which cuts off a blocking impulse to open circuitry and allow the device 8 to measure and analyze a given brain wave (EEG) and the psycho-galvanic skin response (PGR) of a user as will be explained. PGR detector 13 detects large, medium, or small PGR. Discriminators D1, D2, and D3 identify, respectively, large, medium and small PGR so that, by means of invertors 11 and 12, gates AND1 and AND2 and multivibrator M1, 1 volt, 2 volt, or 3 volt impulses are sent from the PGR analyzer 18 to relay A of the mixer logic unit 19 through leads 1V, 2V and 3V. In unit 19, 1, 2 or 3 volt impulses pass from impulse relay A to voltage adder S1 through leads 1V', 2V' and 3V' and to time control unit TC1 through leads 1V'', 2V'' and 3V''. Unit TC1, on receipt of a 1 volt signal, activates tape selector unit 20 through lead 27 for 10.2 seconds, on receipt of a 2 volt signal activates it for 25.2 seconds, and on receipt of a 3 volt signal activates it for 5.2 seconds. At the same time, unit TC1, on receipt of a 1, a 2, and a 3 volt signal sends a blocking signal through lead 21 to voltage adder S1 for, respectively, 10 seconds, 25 seconds, and 5 seconds.

EEG detector 11 sends a signal to filter F1 of EEG analyzer 29 which, in turn, is connected to a multivibrator M2 so that multivibrator M2 sends out a three volt signal if theta waves are detected and no signal if theta waves are not detected. This 3 volt signal passes through leads 22 and 23 to voltage adder S1 in mixer logic unit 19. Voltage adder S1 then sends a signal of 1, 2, 3 4, 5, or 6 volts to tape selector unit 20 through lead 24. The 1 volt signal represents no theta, large PGR, 2 volts represents no theta, medium PGR, three volts represents no theta, small PGR, 4 volts represents theta present, large PGR, 5 volts represents theta present, medium PGR, and 6 volts represents theta present, small PGR. The tape selector unit 20, according to the signal from lead 24, selects one of the tapes 31–36 which tape is then played for 10, 25 or 5 seconds according to a signal from the time control unit TC1 sent by lead 27. The audio system 26 plays the selected tape through speaker system 17 to the user. At the end of the 10, 25, or 5 second period, the blocking signal sent through lead 21 is interrupted so that voltage adder S1 again functions for 0.2 seconds to switch tape selector unit 20 to another tape according to the monitored state of the user.

If switch 40 is closed and switch 41 is opened, light control unit 42 will activate light set 15 if theta waves are monitored and a 3 volt impulse is present in lead 22. If no impulse is present in lead 22, this indicates that no theta waves are being monitored and the light control unit 42 will activate light set 16.

Light set 15 consists of blue, yellow, green and violet lights set to flash alternately in random sequences at low intensity at a rate of about six flashes per second. Light set 16 consists of red, orange, indigo, and green lights set to flash alternately in random sequences at a medium to a high intensity at a rate of about 12 flashes per second. Reflectors 44 positioned behind the lights of the sets 15 and 16 direct the colored lights to the rear of the translucent screen 14 to be watched by a user for his stimulation.

Projected images may be used in place of the light sets 15 and 16. For this purpose, switch 40 is opened and switch 41 is closed. Projector control unit 45 then activates projector 46 when theta waves are detected and projector 47 when theta waves are not detected.

The projected images may be flashed intermittently and colored in the same manner as the light sets 15 and 16 if desired. The foregoing description is merely exemplary of one specific apparatus that can accomplish the purpose of this invention.

The device of this invention interacts with a user in the following manner. Six states of a user are monitored and analyzed, these states being large, medium and small PGR with or without theta waves. The presence of a theta wave usually indicates intellectual or imaginative thought processes are taking place. A large PGR is associated with emotional shock or suspense and lasts for about 10 seconds. A medium PGR is associated with a state of alertness and general receptivity and lasts for up to 25 seconds. A small PGR usually corresponds to an intellectual, emotional state such as emotions of aesthetic appreciation produce.

The states of small, medium and large PGR and the presence of theta waves are defined in the Spanish text entitled ELECTROENCEFALOGRAFIA CLINICA by Prof. Jean Delay and Prof. Georges Verdeaux, translated from French to Spanish by Doctors J. M. Samso Dies and J. Vila Bado, said text being published in Barcelona, Spain, by Toray-Masson, S.A. in 1967.

A state characterized by theta and a small PGR indicates the presence of intellectual or imaginative activity under conditions of emotions either of control or of an aesthetic order. Such a state is compatible with the enjoyment of an aesthetic experience at its highest point. In this state the imaginative faculty is present and the emotions are almost what could be termed serene. This is a highly desirable state characterized by an unfortunately short duration of about 5 seconds.

A state characterized by theta and a medium PGR indicates the presence of intellectual or imaginative activity under conditions of receptivity and alertness. It also characterizes a state of controlled alertness. Such a state in either case is not incompatible with what is experienced at certain stages of the process of aesthetic enjoyment. In one case something has caught the user's interest and he is receptive for more. In the other case the user's interest has been caught and at the same time a train of thought or of images has been set into motion through the process of association.

A state characterized by theta and a large PGR is associated with a state of relief or satisfaction in an intensely emotional situation or it is associated with an intensely emotional state accompanied by imaginative activity of some sort. This state is compatible with certain stages of an aesthetic experience.

The non-theta states appear to be associated with the transitional phases of an aesthetic experience which should culminate eventually in the theta-small PGR state. These states are the functional states of the aesthetic experience showing the emotional correlation of the PGR effect with little or no imaginative activity. These are the states in which the basis for imaginative or intellectual activity are formed. They are also the states to which a return is made when a particular burst of mental activity is culminated.

The device of this invention tends to bring the user to the desired theta-small PGR state by means of musical stimulation and visual stimulation. The duration of these stimuli have been chosen to correspond to the response time for a given PGR for a human being. The theta waves have a frequency of 4 to 8 cycles per second so that restful, low intensity colors of the lights 15 are flashed at an average of 6 cycles per second. The brain wave frequencies above theta waves are above 8 cycles per second with bursts of up to 20 cycles per second. Thus the lights 16 are flashed at 12 cycles per second with more intense, vivid and moving colors.

The musical stimuli is of two types. For the non-theta states transitional music is employed for the purpose of moving the user out of those states. For theta states holding music is used with the purpose of holding the user in a theta state with a definite bias toward the theta/small PGR state.

For the theta-small PGR state which indicates the presence of intellectual or imaginative activity under conditions of emotions of an aesthetic order, the sort of musical stimulus that would most adequately induce this state and act as a holding stimulus to keep the user in this state would be certain excerpts from Bach and also certain passages from the musical school known as "Cool Jazz" as exemplified by Paul Desmond and David Brubeck. The duration of these passages would be on the order of 5 seconds.

The theta-medium PGR states indicates the presence of intellectual or imaginative activity under conditions of receptivity and mental alertness. This state is slightly transitional and therefore it is easiest to move the subject from this state to the theta-small PGR state. Certain passages of Beethoven and of Hindu Raga music would appear to be best suited for this purpose. This musical stimulus must have the effect of keeping the intellectual or imaginative activity present and at the same time add enough emotional content so that the stimulus serves as a springboard to the higher aesthetic reaches. The duration of these passages would be on the order of 25–30 seconds.

The theta-large PGR state indicates the presence of intellectual or imaginative activity under conditions of surprise. It also indicates a strongly emotional situation. This state is even more transitional than the other two theta states. The musical stimulus for this state should be low in emotional content and high in intellectual content. Certain passages of Hindu Raga music and certain passages of Japanese No music are appropriate to bring about the desired result which is a transition out of this state. The duration of these passages should be approximately 10 seconds.

During the non-theta small PGR state there is either the presence of emotions of an aesthetic order or there is a situation of self-control on the part of the user. This is a transitional state. To bring about a movement out of this state, it is necessary to employ a musical stimulus that is high in intellectual content and, insofar as is possible is also high in emotional content. Such music would be found in certain passages of Beethoven and Wagner. The duration of these passages would be on the order of 5 seconds.

The non-theta medium PGR state is one of receptivity and alertness. It is also a transitional state; and for the purpose of musical stimulation, two types of music interspersed with each other should be used. Passages of music of high emotional content should be interspersed with passages of music of a high intellectual content. Highly emotional music can be some of the popular music of today. Highly intellectual music can be certain passages of Hindu Raga music as well as by some of the so called Computer Music.

The non-theta large PGR state is one of emotional surprise or of shock. This is a transitional state and it calls for musical stimuli that counteracts this highly charged emotional state. Certain passages of Bach, Beethoven, Mozart and Tchaikovsky can be employed for this purpose. The duration of these passages should be about 25 seconds.

The musical stimuli that have been given as examples do not exhaust the possibilities. There are many sounds, musical passages, chorales and the like that will produce the same results as the music that has been indicated.

Thus it may be seen that the device of this invention ensures a greater enjoyment by a user by monitoring the user's mental state to select audio-visual stimuli to move him toward a desired state of greater enjoyment. The specific apparatus, the generally unconscious or reflex responses of a user that are monitored, and the stimuli that are presented in response to the monitoring that have been described hereinbefore are but one example of the basic concept of this invention. Extensive modifications may be made without departing from the spirit of this invention.

What is claimed is:

1. An entertainment device comprising, in combination, means presenting stimuli to a user, said means presenting stimuli to a user having tapes with musical passages thereon, a tape selector unit, an audio system for playing tapes selected by said tape selector unit to a user, a screen, means directing visual color stimuli of higher and lower intensity on said screen for viewing by a user, and a logic unit controlling said tape selector unit to play selected tapes for given time intervals while simultaneously controlling said means directing visual color stimuli on said screen to direct a visual color stimulus of selected intensity on said screen; and monitoring means read after each time interval by said logic unit, said monitoring means being at least an EEG machine monitoring the presence and absence of theta waves of a user and monitoring the small, medium, and large PGR of a user, said monitoring means on being read by said logic unit activating said logic unit to control said tape selector unit to select one of said tapes for said audio system to play a given musical passage thereon and to control said means directing visual color stimuli on said screen to direct a visual color stimulus of a selected intensity on said screen while said musical passage is played according to the monitored large, medium, and small PGR and the presence and absence of theta waves of the user to urge the user toward a desired state of aesthetic experience.

2. The combination according to claim 1 wherein said EEG machine includes means for activating said logic unit to present stimuli for given intervals of 5 seconds when a small PGR is monitored, for 25 seconds when a medium PGR is monitored, and for 10 seconds when a large PGR is monitored.

3. The combination according to claim 2 wherein said means directing visual stimuli on said screen has colored lights of high and low intensity, said means randomly flashing said colored lights of low intensity on said screen when said EEG machine monitors the presence of theta waves, and randomly flashing said colored lights of high intensity on said screen when said EEG machine monitors the absence of theta waves.

4. The combination according to claim 3 wherein said colored lights of low intensity are flashed at about six flashes per second and said colored lights of high intensity are flashed at about 12 flashes per second.

5. The combination according to claim 1 wherein said means directing visual color stimuli on said screen forms selected visual images on said screen.

* * * * *